INVENTORS
ROBERT M. HASTINGS
JACK R. VICKERMAN
ROBERT J. BROADWELL

Oct. 22, 1963   R. M. HASTINGS ETAL   3,107,694
PLURAL VALVE ARRANGEMENTS
Filed April 22, 1960   4 Sheets-Sheet 2

INVENTORS
ROBERT M. HASTINGS
JACK R. VICKERMAN
ROBERT J. BROADWELL
BY Cushman, Darby & Cushman
ATTORNEYS

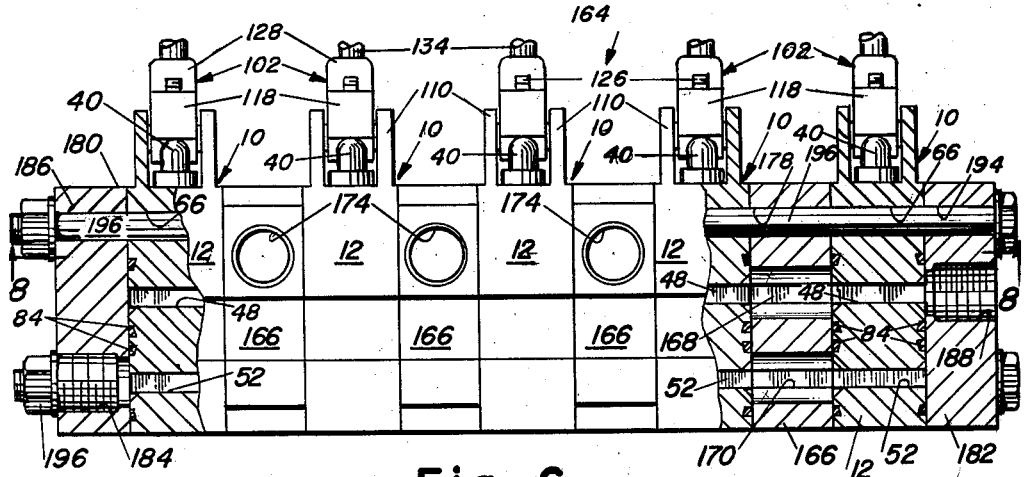

United States Patent Office 3,107,694
Patented Oct. 22, 1963

3,107,694
PLURAL VALVE ARRANGEMENTS
Robert M. Hastings, Jack R. Vickerman, and Robert J. Broadwell, Cleveland, Ohio, assignors to Aurora Corporation of Illinois, Chicago, Ill., a corporation of Illinois
Filed Apr. 22, 1960, Ser. No. 24,036
19 Claims. (Cl. 137—627.5)

This invention relates to valve mechanisms and, more particularly, to improvements in plural valve mechanism arrangements.

In copending application Serial No. 17,363, filed March 24, 1960, there is disclosed a basic valve mechanism unit which is arranged to be connected with suitable conduits by means of adapter plates mounted on opposite sides of the valve body of the basic valve mechanism unit. As indicated in the above-mentioned application, the basic valve mechanism unit is such that it readily lends itself to various plural arrangements.

Accordingly, it is an object of the present invention to provide various plural valve mechanism arrangements utilizing two or more of such basic valve mechanism units.

Another object of the present invention is the provision of a plural valve mechanism arrangement embodying two basic valve mechanism units of the type described and improved adapter plate means for connecting such valve mechanism units in a dual arrangement.

Still another object of the present invention is the provision of a plural valve mechanism arrangement embodying a plurality of basic valve mechanism units of the type described and improved adapter plate means for connecting such valve mechanism units in a plural in-line arrangement.

Still another object of the present invention is the provision of a plural valve arrangement embodying a plurality of basic valve mechanism units of the type described and improved adapter plate means for connecting such valve mechanism units in a parallel bank arrangement.

These and other objects of the present invention will become more apparent during the course of the following detailed description and dependent claims.

The invention may best be understood with reference to the accompanying drawings wherein an illustrative embodiment is shown.

In the drawings:

FIGURE 6 is a side elevational view, partly broken away, showing an in-line plural valve mechanism arrangement embodying the principles of the present invention;

FIGURE 7 is a front elevational view, partly broken away, of the arrangement shown in FIGURE 6;

FIGURE 8 is a cross-sectional view taken along the line 8—8 of FIGURE 6;

FIGURE 9 is a front elevational view of an intermediate adapter plate utilized in the arrangement shown in FIGURE 6;

Figure 1:
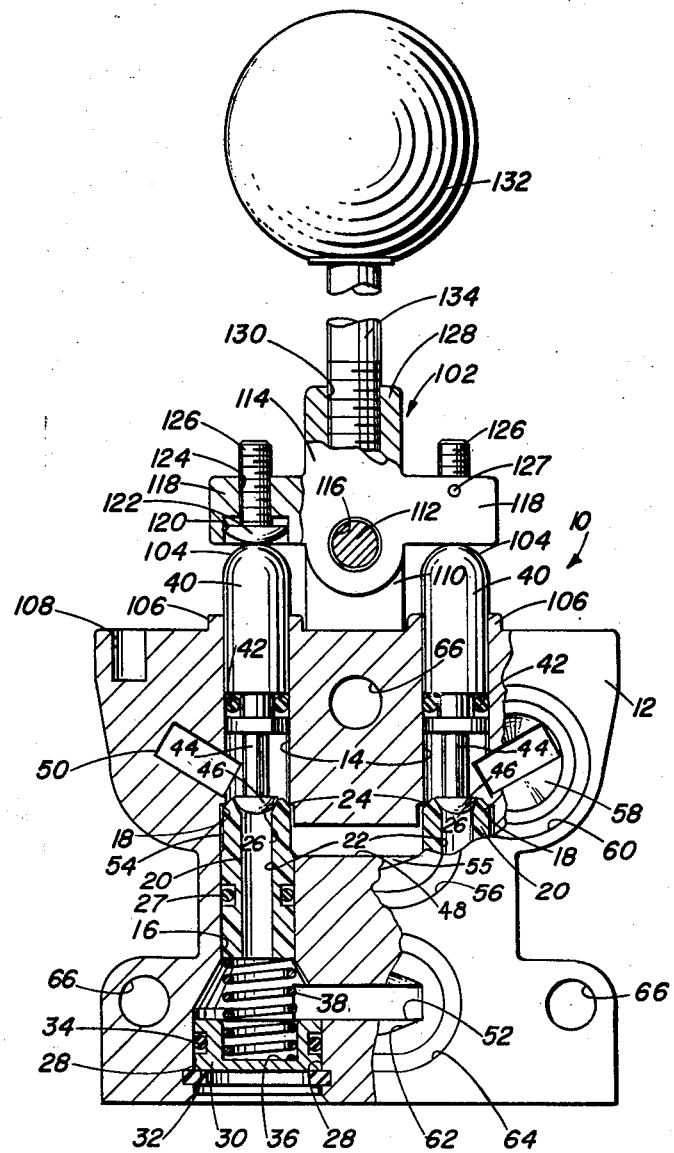
FIGURE 1 is a front elevational view, partly broken away, of a basic valve mechanism unit utilized in the plural valve mechanism arrangements embodying the principles of the present invention.

Referring now more particularly to the drawings, there is shown in FIGURE 1, a basic valve mechanism unit 10 which is utilized in the plural valve mechanism arrangements of the present invention. The basic valve mechanism unit 10 includes a valve body 12 of any suitable material, a preferred material being cast aluminum alloy. Formed in the valve body is a valve cavity in the form of a pair of parallel bores 14 extending therethrough, each bore having a counterbore 16 formed in one end thereof defining an annular shoulder 18 which forms a valve seat between each bore 14 and counterbore 16. Slidably mounted within each counterbore 16 is a valve member 20 having a central port or passageway 22 extending longitudinally or axially therethrough. The end of each valve member 20 adjacent the valve seat 18 is formed with an outwardly facing outer frusto-conical surface 24 which is arranged to engage the associated valve seat 18 with a substantial line contact and an inwardly facing inner frusto-conical surface 26 forming a valve seat in the associated passageway 22. In order to prevent leakage past the periphery of each valve member 20 within the associated counterbore 16, suitable sealing means is provided, such as an O-ring seal 27 mounted within an appropriate annular groove formed in the periphery of each valve member 20.

The outer extremity of each counterbore 16 has a second counterbore 28 formed therein within which a plug member 30 is mounted. Each plug member is secured within the associated counterbore 28 by any suitable means as, for example, a snap ring 32 arranged to fit within an appropriate annular groove formed in the counterbore 28. Preferably, suitable sealing means are provided on the plug to prevent leakage of fluid outwardly through the associated counterbore 28, as, for example, an O-ring seal 34 mounted in an appropriate annular groove formed in the periphery of the plug.

As shown in FIGURE 1, the plug member 30 is formed with an inwardly facing socket 36 arranged to receive one end of a compression spring 38 the opposite end of which engages the adjacent end of the associated valve member 20. It will be seen that the springs 38 serve to resiliently urge the valve members 20 upwardly, as shown in FIGURE 1, so that the surfaces 24 thereof will engage the valve seats 18.

Mounted within each of the bores 14 is a second valve member 40 preferably in the form of a plunger or the like and having suitable sealing means therein for engaging the wall of the associated bore 14, such as an O-ring seal 42 mounted within an appropriate annular groove formed in the periphery thereof. Extending downwardly and forming an integral part of each valve member 40 is a valve stem 44 having a segmental spherical valve element 46 integrally formed on the extremity thereof for engaging the valve seat formed by the frusto-conical surface 26 of the associated valve member 20.

The valve members 20 and 40 are arranged to control the flow of fluid from a high pressure port or opening 48 to a working port or opening 50 associated with each of the bores 14 and from the working ports to a low pressure port or opening 52. The ports 48, 50 and 52 extend completely through the valve body in a direction transverse to the extent of the valve cavities formed by the bores 14 and the counterbores 16. The high pressure port 48 is of elongated rectangular cross-sectional configuration and is formed within the valve body between the counterbores 16 thereof adjacent the valve seats 18. As shown in FIGURE 1, the ends of the rectangular high pressure port 48 communicate with both counterbores 16 at positions adjacent the valve seats 18, the periphery of the adjacent end portion of the valve members 20 being relieved as indicated at 54 to permit flow thereby. Preferably, the outer surfaces of the valve body 12 adjacent port 48 are also relieved, as indicated at 55, by the provision of substantially elliptical depressions or the like. Surrounding each depression 55 is an annular groove 56 of elliptical or oval configuration.

Each working port 50 is preferably also of rectangular configuration in cross-section and is disposed in the valve body 12 outwardly of the associated bore 14 with one end thereof in communication with the bore adjacent the associated valve seat 18. The outer surfaces of the valve body 12 adjacent each of the working ports 50 are relieved, as indicated at 58, by the provision of substantially circular depressions. Surrounding each circular depression 58 is an annular groove 60 of circular configuration.

The low pressure port 52 is preferably formed with an elongated rectangular cross-sectional configuration similar to the configuration of the high pressure port 48 and is disposed within the valve body 12 in parallel relationship to the high pressure port 48 between the second counterbores 28 with its ends respectively in communication therewith. As before, the outer surfaces of the valve body adjacent the port 52 are relieved, as indicated at 62, by substantially elliptical depressions and surrounding each depression is an elliptical or oval annular groove 64.

The grooves 56, 60 and 64 are arranged to receive annular sealing elements 84 (see FIGURES 3, 6, 8, 10 and 12) which serve to provide a fluid-tight seal between the associated port end and an adjacent surface. The sealing elements 84 are preferably of rectangular cross-section and may be of any suitable material, such as rubber, plastic or the like.

It will be understood that the ports 48, 50, and 52 are adapted to be connected to a source of high pressure fluid, a working instrumentality, and source of low pressure fluid respectively. The provision of parallel through ports in the valve body 10 renders the valve mechanism unit 10 readily adaptable for connection with any desired conduit arrangement. For example, some installations require that all conduits be connected to the valve mechanism on one side thereof, other conduit arrangements require that the working ports be connected on one side of the valve mechanism unit while the high pressure and low pressure ports are connected on the opposite side thereof, still other arrangements may require one of the ports to be connected on one side and three of the ports on the other. With the present basic valve mechanism unit, these various requirements can be readily accommodated by the selection of suitable adapter plates or conduit receiving plates which are arranged to be mounted on opposite sides of the valve body 12. While such plates may be connected by any suitable means to the valve body, preferably, the valve body is provided with a plurality of bolt receiving apertures or openings 66 extending therethrough in a direction parallel with respect to the ports for this purpose.

The basic valve mechanism unit also provides a universal rocker arm assembly, generally indicated at 102, which renders the present basic valve unit suitable to receive any desired type of actuating mechanism. As shown in FIGURE 1, the valve members 40 extend outwardly of the bores 14 and have their outer extremities formed into a semi-spherical configuration, as indicated at 104. Preferably, a ring-like projection 106 is formed on the exterior surface of the valve body in surrounding relation to the outwardly extending end of each valve member 40. In addition, suitable fastening receiving apertures 108 are formed in the adjacent surface of the valve body at opposite ends thereof.

The rocker arm assembly 102 is pivotally mounted on the valve body 12 in a position to engage the surfaces 104 of the valve members 40 by any suitable means, such as a pair of integrally formed transversely spaced upstanding lugs 110 apertured to receive a pin 112 therethrough. The rocker arm assembly includes a rocker arm member 114 disposed between the lugs 110 and having a central aperture 116 formed therein for receiving the pin 112. Extending outwardly from the central portion of the rocker arm member is a pair of generally horizontally extending arm portions 118 each of which is provided with a socket-like opening 120 for receiving a valve member engaging element 122 having an arcuate surface for engaging the semi-spherical extremity 104 of the associated valve member 40. Extending through each arm portion 118 into communication with the associated opening 120 is an internally threaded aperture 124 and, as shown in FIGURE 1, a set screw 126 is engaged within the threaded opening 124 to incrementally adjust the position of the associated valve member engaging element 122. Any suitable means may be provided for maintaining the set screws 126 in their adjusted positions, for example, the set screws themselves may be formed with plugs of plastic which extend across the threads or, such plastic plugs may be provided across the threads of the opening 124, as indicated at 127 in FIGURE 1. Extending upwardly from the central portion of the rocker arm 114 is a socket portion 128 having a central internally threaded opening 130 formed therein.

It will be understood that in utilizing the basic valve mechanism unit 10 in plural arrangements in accordance with the principles of the present invention, any of the various actuating mechanisms disclosed in the above-mentioned copending application may be utilized to actuate each of the basic valve mechanism units. In FIGURE 1, there has been shown a simple actuating lever 134, but it will be understood that single or dual solenoid actuating mechanisms, cam follower actuating mechanisms and other types of actuating mechanisms may be employed.

In accordance with the principles of the present invention, a plurality of basic valve mechanism units 10 utilized with suitable adapter plates, hereinafter to be more fully described, can be made up into different plural arrangements to suit the particular installation. It will be understood that in all of the installations, a source of fluid under high pressure, either gas or liquid, is communicated with the high pressure port 48 and a source of fluid under low pressure is communicated with the low pressure port 52. The terms high and low pressure are relative, and therefore, comprehend within their meaning the utilization of a pump to supply fluid to the high pressure port at a value above atmospheric pressure and a simple sump communicated with the low pressure port or the provision of a vacuum pump communicating with the low pressure port to provide a source of fluid at a pressure less than atmospheric pressure and a simple sump communicated with the low pressure port or the provision of a vacuum pump communicating with the low pressure port to provide a source of fluid at a pressure less than atmospheric pressure and a simple sump connected with the high pressure port. Of course, where the fluid utilized is air, it is often not necessary to connect a conduit to the low pressure port where a compressor is utilized or a conduit to the high pressure port where an air vacuum pump is utilized, since the respective ports may simply exhaust to atmosphere.

In the normal operation of the basic valve mechanism unit 10, connected in the manner indicated above, and having a simple manual control lever 132 connected therewith to actuate the same, as shown in FIGURE 1, the lever will be normally resiliently biased by the springs 38 into a flow preventing or null position, such as shown in FIGURE 1. The engagement of the surfaces 24 of the valve members 20, with their respective valve seats 18, serves to prevent flow of fluid from the high pressure port 48 to the working ports 50 and the engagement of the valve elements 46 of the valve members 40 with the valve seats 26 of the valve members 20 serves to prevent flow of fluid from the working ports 50 to the low pressure port 52. When it is desired to actuate the working instrumentality, the actuating lever is moved to pivot the rocker arm assembly 102 in either a counterclockwise or clockwise direction, depending upon the particular movement of the working instrumentality desired. For example, when the lever arm is moved to the right, as shown in FIGURE 1, the right hand valve member 40 is moved downwardly, which in turn moves the associated valve member 20 downwardly through the engagement of the valve element 46 with the valve seat 26, thus compressing the associated spring 38. It will be seen that this downward movement of the cooperating right hand valve members 40 and 20 will move the surface 24 of the valve member 20 downwardly away from the valve seat 18, thus communicating the high pressure port 48 with the right hand working port 50. It will also be noted that during this movement the right hand working port 50 is closed from communication with the low pressure port through the engagement of the associated valve element 46, with the associated valve seat 26.

Simultaneously with the downward movement of the right hand valve members indicated above, the left hand valve member 40 will move upwardly as a result of the pressure within the left hand working port 50 acting on the downwardly facing surface of the valve member 40 adjacent the upper end of the stem 44. The upward movement of the left hand valve member 40 communicates the left hand working port 50 with the low pressure port 52 through the passageway 22 in the left hand valve member 20. It will also be noted that spring 38 serves to retain the left hand valve member 20 in its uppermost position with the surface 24 thereof in engagement with the associated valve seat 18 thus closing communication of the high pressure port 48 with the left hand working port 50.

It will be understood that when the control lever 132 is moved in the opposite direction past the null position, as, for example, to the left, as shown in FIGURE 1, the reverse operation will occur so that the left hand working port 50 is communicated with the high pressure port 48 and the right hand working port 50 is communicated with the low pressure port 52.

Figure 2:
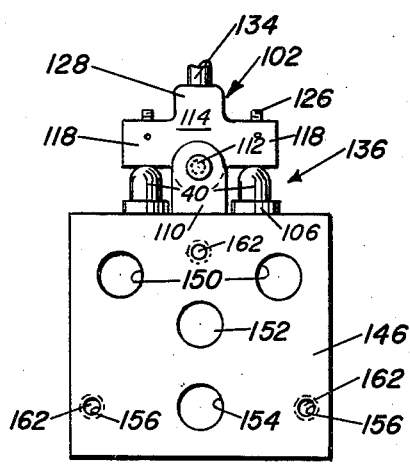
FIGURE 2 is a front elevational view of a dual valve mechanism arrangement embodying the principles of the present invention.
Figure 3:
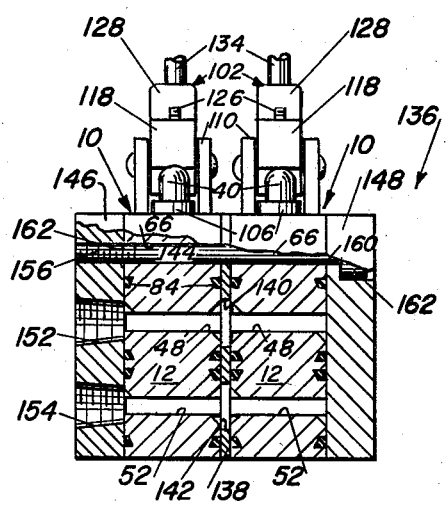
FIGURE 3 is a side elevational view, partly broken away, of the valve mechanism arrangement shown in FIGURE 2.
Figure 4:
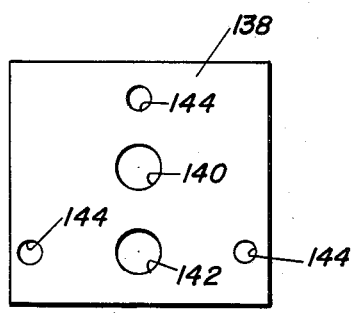
FIGURE 4 is a front elevational view of the intermediate adapter plate of the arrangement shown in FIGURES 2 and 3.
Figure 5:
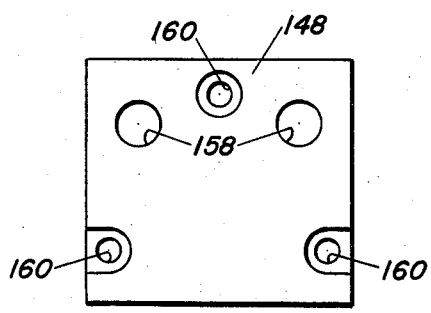
FIGURE 5 is a front elevational view of the outer rear adapter plate of the arrangement shown in FIGURES 2 and 3.

Referring now more particularly to FIGURES 2 through 5, there is shown therein a dual valve mechanism arrangement, generally indicated at 136, embodying the principles of the present invention which includes two basic valve mechanism units 10. The basic valve mechanism units are disposed in general parallel relation and have interposed therebetween an intermediate adapter plate 138. As best shown in FIGURE 4, the intermediate adapter plate 138 includes a pair of port communicating openings 140 and 142, the opening 142 serving to communicate the high pressure ports 48 of the basic valve mechanism units and the opening 142 serving to communicate the low pressure ports 52 of the valve mechanism units 10. In addition, the intermediate adapter plate 138 is provided with a series of bolt receiving openings 144 which are disposed in a position to align with the bolt receiving openings 66 of the valve mechanism units 10.

As shown in FIGURES 2 and 3, the dual valve mechanism arrangement 136 also includes a pair of outer adapter plates 146 and 148. As shown in FIGURE 2, the adapter plate 146 includes a pair of working port communicating openings 150 which are arranged to align with the working ports 50 of the adjacent basic valve mechanism unit 10 and a pair of pressure port communicating openings 152 and 154. The opening 152 is arranged to align with the high pressure port 48 of the adjacent valve mechanism unit 10 and the opening 154 is arranged to align with the low pressure port 52 of the adjacent valve mechanism unit 10. Preferably, the openings 150, 152 and 154 are interiorly threaded to receive conduit connectors of conventional construction. In addition, the adapter plate 146 is provided with a series of bolt receiving openings 156 which are disposed so as to align with the bolt receiving openings 66 of the valve mechanism unit 10.

The adapter plate 148 is provided with a pair of working port communicating openings 158 which are in alignment with the working ports 50 of the adjacent valve mechanism unit 10. In addition, the plate 148 is provided with a plurality of bolt receiving openings 160 which are disposed in alignment with the bolt receiving openings 66 of the basic valve mechanism unit.

It will be seen that the pair of valve mechanism units 10, intermediate adapter plate 138 and outer adapter plates 146 and 148 are retained in superposed relation or sandwich construction by any suitable means, such as a plurality of bolts 162 extending through the course, the sealing elements 84 previously described serve to provide a fluid-tight seal between each valve unit port and the adjacent adapter plate surface. If desired, the openings 160 may be countersunk to receive the head of the bolts 162 and the openings 156 may be interiorly threaded to engage the opposite ends of the bolts.

It will be understood that with the dual valve arrangement 136, the outer adapter plates must be provided with working port communicating openings such as the openings 150 and 158. This permits each of the valve mechanism units 10 to be connected separately to a working instrumentality, and it will be noted that the intermediate plate serves to separate the aligned working ports of the two valve mechanism units utilized. In the embodiment shown in FIGURES 2 through 5, both of the conduit connectors to the high and low pressure ports are provided on one side of the arrangement. It will be understood that rather than providing one outer plate with four port communicating openings and the other outer plate with two port communicating openings, both outer plates may be provided with three port communicating openings, two of which communicate with the working ports. With this arrangement, the high pressure conduit would connect at one end of the arrangement while the low pressure conduit would connect at the other end thereof.

Referring now more particularly to FIGURES 6 through 9, there is shown therein a plural in-line valve mechanism arrangement, generally indicated at 164, which embodies the principles of the present invention and includes a plurality of basic valve mechanism units 10 of a number greater than two. While the arrangement 164 is susceptible to the utilization of only two valve mechanism units 10, where only two units are utilized in the arrangement, it is preferable to utilize the adapter plates described above in connection with the arrangement 136 shown in FIGURES 2 through 5. In the arrangement 164 shown in FIGURE 6, there are five basic valve mechanism units 10 utilized, but it will be understood that three, four or more than five such units may be utilized, if desired.

In the valve mechanism arrangement 164, there is provided an intermedaite adapter plate or member 166 which is disposed between adjacent units 10. Each intermediate adapter member or plate 166 is provided with a substantially elliptical high pressure port communicating opening 168 and a substantially elliptical low pressure port communicating opennig 170, the openings 168 and 170 being disposed in the adapter plate so as to align with the high pressure ports and low pressure ports in the adjacent units 10. Each intermediate adapter plate 166 also includes a pair of working port communicating openings 172 of substantially L-shaped configuration. The openings 172 extend to one surface of the adapter plate 166 in a position to align with the working ports of the adjacent unit 10. These openings then extend transversely outwardly to the adjacent end surface of the adapter plate and are interiorly threaded, as indicated at 174, to receive a conduit connector of conventional construction. In addition, each intermeditae adapter plate 166 is provided with a plurality of bolt receiving openings 178 which are disposed therein in a position to align with the bolt receiving openings 66 of the basic valve mechanism units. The intermediate adapter plates 166 may be of any suitable material, a preferred material being cast aluminum alloy.

In addition to the intermediate adapter plates 166, the plural in-line valve mechanism arrangement 164 also includes a pair of outer adapter plates 180 and 182. The adapter plate 180 is provided with a low pressure port communicating opening 184 which is preferably interiorly threaded to receive a conventional conduit connector. In addition, the adapter plate 180 also includes a plurality of bolt receiving openings 186 which are disposed in alignment with the bolt receiving openings 66 of the valve mechanism units.

As best shown in FIGURE 7, the outer adapter plate 182 is provided with a high pressure port communicating opening 188 disposed in alignment with the high pressure port 48 of the adjacent basic valve mechanism unit. The adapter plate 182 also includes a pair of working port communicating openings 190 which are preferably of L-shaped configuration similar to the openings 172 previously described. Thus, each opening 184 extends to the inner surface of the adapter plate 182 in alignment with the associated working port 50 of the adjacent valve mechanism unit 10 and extends laterally outwardly therefrom to the adjacent end surface of the plate and is interiorly threaded, as indicated at 192, to receive a conventional conduit conector. In addition, the adapter plate 182 is provided with a plurality of bolt receiving openings 194 which are disposed in alignment with the bolt receiving openings 66 of the basic valve mechanism unit. As before, the entire arrangement, including the five valve mechanism units 10, four intermediate adapter plate 180 and 182 are retained together by any suitable means, such as elongated bolt assemblies 196 extending through the openings 66, 178, 186 and 194.

With the arrangement 164 shown in FIGURES 6 through 9, there is provided five laterally extending conduit connections for the working ports of the valve mechanism units on opposite ends thereof. In addition, there is provided a longitudinally extending conduit connection at each side of the arrangement for connection respectively with the high pressure ports and low pressure ports of the units. It will be understood that the outer adapter plate 180 may simply be an imperforate plate provided with bolt receiving openings, while the outer adapter plate 182 may be correspondingly provided with a low pressure port communicating opening in addition to the openings formed therein. Conversely, the high pressure port communicating opening 188 may be eliminated from the adapter plate 182 and provided in the adapter plate 180, if desired.

Figure 10:
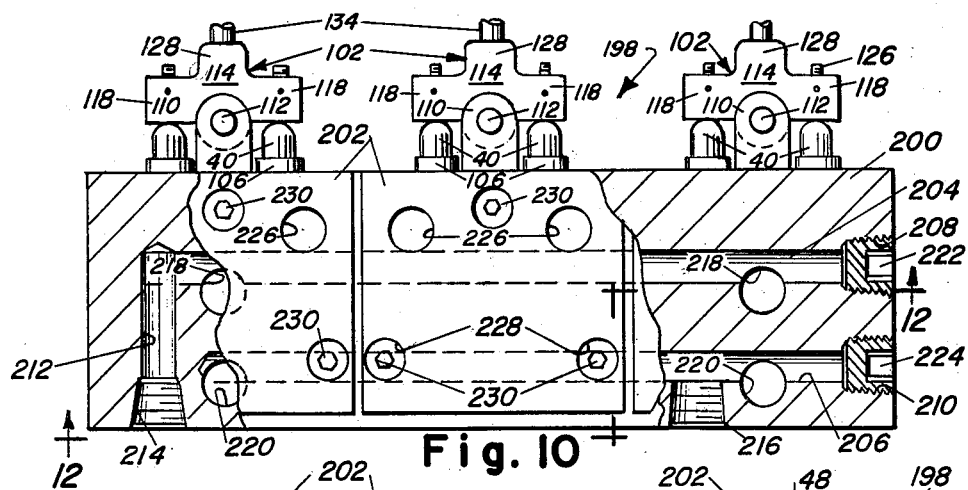
FIGURE 10 is a side elevational view, partly broken away, of a parallel bank plural valve mechanism arrangement embodying the principles of the present invention.
Figure 12:
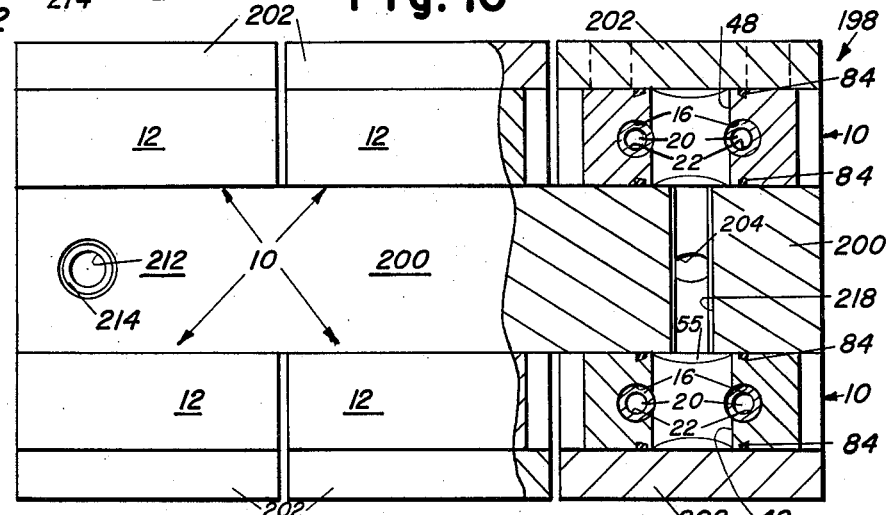
FIGURE 12 is a cross-sectional view taken along the line 12—12 of FIGURE 10.
Figure 11:
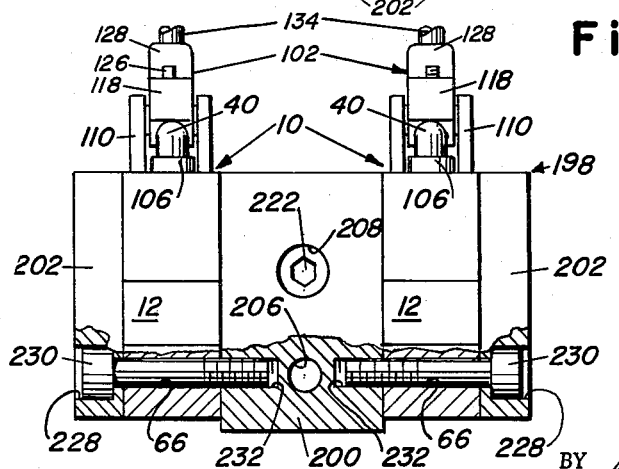
FIGURE 11 is a rear elevational view, partly broken away, of the arrangement shown in FIGURE 10.

Referring now, more particularly, to FIGURES 10 through 12, there is shown therein a plural parallel bank valve mechanism arrangement, generally indicated at 198 embodying the principles of the present invention, which includes a plurality of basic valve mechanism units 10 arranged in two parallel banks, and an intermediate pressure communicating adapter plate or manifold 200 and an outer adapter plate 202 for each valve mechanism assembly. The intermediate adapter plate or manifold 200 includes a pair of longitudinally extending parallel bores 204 and 206, the bore 204 constituting a high pressure passage and the bore 206 constituting a low pressure passage. Preferably, the bores 204 and 206 extend inwardly of the adapter plate 200 from one end thereof and the outer extremity of each bore is threaded, as indicated at 208 and 210 respectively. The inner end of the bore 204 communicates with the inner end of a transversely extending bore 212, the outer extremity of which is interiorly threaded, as indicated at 214. The bore 206 communicates with a lateral, interiorly threaded, opening 216 intermediate the ends thereof.

Extending transversely through the adapter plate 200 in a position to communicate with the high pressure passage 204 is a plurality of longitudinally spaced bores 218, the bores 218 being positioned to align with the high pressure port 48 of the associated valve mechanism units 10. Three corresponding bores 220 extend transversely through the adapter plate 200 in parallel relation to the bores 218 in a position to communicate with the low pressure passage 206 and to align with the low pressure port 52 of the associated valve mechanism units 10. It can be seen that the main high pressure passage 204 and related laterally extending through bores 218 provide for the communication of fluid to the high pressure port 48 of each of the six valve mechanism units 10 utilized in the arrangement 198.

The bore 212 provides an alternative conduit connection to the main high pressure passage 204 of the adapter plate 200. That is, a conventional conduit connector may either be secured within the opening 214 or 208 and the other opening provided with a suitable plug 222 or the like. As shown in FIGURES 10 and 11, the plug 222 is engaged within the opening 208 while the opening 214 is provided for connection with the high pressure fluid source. In a like manner, the low pressure passage 206 together with the lateral throughports 220 communicating therewith provide for the communication of fluid to the low pressure port 52 of each of the six valve mechanism units 10 utilized in the arrangement 198. The lateral opening 216 provides with the opening 210 alternative conduit connections for the arrangement. That is, as before, either of the openings 210 or 216 may be utilized to receive conduit connector associated with the low pressure source and the other is provided with a suitable plug 224 or the like. As shown in FIGURES 10 and 11, the plug 224 is engaged within the opening 210 so that the opening 216 is arranged to be connected to the low pressure fluid source.

The outer adapter plates 202 are similar to the adapter plates 148 previously described in connection with the arrangement 136 shown in FIGURES 2–5. Thus, each adapter plate 202 is provided with a pair of working port communicating openings 226 which are arranged to be disposed in alignment with the working ports 50 of the associated valve mechanism unit 10. In addition, each adapter plate 202 is provided with a plurality of bolt receiving openings 228 which preferably are countersunk and are disposed to align with the bolt receiving opening 66 of the basic valve mechanism units 10. As best shown in FIGURE 11, each valve mechanism unit 10 and associated outer adapter plate 202 is secured to the intermediate adapter plate 200 by any suitable means such as bolts 230 extending through the openings 228 of the adapter plate 202, openings 66 of the valve mechanism units 10 and into registering interiorly threaded blind openings 232 formed in the intermediate adapter plate 200.

It will be understood that while there are shown six valve mechanism units 10 in the arrangement 198 shown in FIGURES 10–12, two, four or more than six (preferably in multiples of two) valve units may be employed. Of course, where only two valve mechanism units 10 are employed the arrangement 136 of FIGURES 2–5 is preferred.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A plural valve mechanism comprising a plurality of separate valve mechanism units, each of said units comprising a valve body having formed therein a longitudinally extending valve cavity and three parallel openings extending completely therethrough transversely with respect to said cavity and each communicating with the latter, said three openings constituting high pressure, low pressure and working ports, and valve means mounted within said cavity for movement into different positions to control the flow of fluid from said high pressure port to said working port and from said working port to said low pressure port; and means for connecting said units together providing an exterior opening for communication with a source of high pressure fluid and passage means for communicating said opening with all of the high pressure ports of said units, an exterior opening for communication with a source of low pressure fluid and passage means for communicating said low pressure fluid opening with all of the low pressure ports of said units, and passage means communicating with each working port providing an associated exterior opening for communication with a working device.

2. A plural valve mechanism as defined in claim 1 wherein said plurality of valve mechanism units comprises a single pair of units disposed in spaced parallel relation with their corresponding ports in substantial alignment, and wherein said connecting means comprises an intermediate adapter plate fixedly mounted between said units and outer adapter plates mounted on opposite sides of said units, said intermediate adapter plate closing communication between the working ports of said units and providing said high and low pressure passage means communicating the high and low pressure ports respectively of said units, each of said outer adapter plates providing said exterior opening for the working port of the associated unit, one of said outer adapter plates providing said high pressure opening with the other closing the adjacent end of the high pressure port of the associated unit, one of said outer adapter plates providing said low pressure opening with the other closing the adjacent end of the low pressure port of the associated unit.

3. A plural valve mechanism as defined in claim 1 wherein said plurality of valve mechanism units is disposed in two parallel banks with each unit of one bank in spaced parallel relation with a unit of the other bank and their corresponding ports in substantial alignment, and wherein said connecting means comprises an intermediate adapter member fixedly mounted between said banks of units, said intermediate adapter member providing said high and low pressure exterior opening and passage means for all of said units, and an outer adapter plate fixedly mounted on the outer side of each of said units providing said working port communicating exterior opening for the associated unit.

4. A plural valve mechanism as defined in claim 1 wherein said plurality of valve mechanism units is disposed in spaced parallel relation with their corresponding ports in substantial alignment, and wherein said connecting means comprises an intermediate adapter plate fixedly mounted between each adjacent pair of units closing communication between adjacent working ports, each of said intermediate adapter plates providing said working port communicating passage means and said associated exterior opening for one of the associated units, said associated opening extending laterally outwardly of each intermediate adapter plate, each of said intermediate adapter plates also providing said high pressure and low pressure passage means for both of the associated units, said connecting means also including a pair of outer adapter plates fixedly mounted on the outer side of the outer parallel units, said outer adapter plates providing said working port communicating passage means and said associated exterior opening for one of the associated units, said outer adapter plates also providing said high pressure and low pressure exterior openings.

5. A plural valve mechanism arrangement comprising a pair of separate valve mechanism units each comprising a valve body having formed therein a longitudinally extending valve cavity and three parallel openings extending completely therethrough transversely with respect to said cavity and each communicating with the latter, said three openings constituting high pressure, low pressure and working ports; and valve means mounted within said cavity for movement into different positions to control the flow of fluid from said high pressure port to said working port and from said working port to said low pressure port; said pair of valve units being disposed in spaced parallel relation with corresponding ports in alignment, means fixedly connected between said pair of valve units closing communication between the working ports of said units and having openings formed therein communicating the high pressure and low pressure ports respectively of said valve units, and means fixedly connected to the opposite sides of said pair of valve units providing a conduit engaging opening communicating with the working port of at least one of the associated units.

6. A plural valve mechanism as defined in claim 5 wherein the means connected between said pair of valve units comprises an intermediate adapter plate and the means on opposite sides of said pair of valve mechanism units comprises outer adapter plates, said adapter plates and said valve mechanism units having aligned openings formed therein and fastening elements disposed in said aligned openings securing said adapter plates and said valve units in superposed relation.

7. A plural valve mechanism as defined in claim 6 wherein each of said units has planar surface means on opposite sides thereof adjacent the associate ends of said ports and an annular groove formed in said planar surface means in surrounding relation to the adjacent end of each of said ports, and wherein an annular sealing element is disposed within each of said grooves in engagement with the adjacent surface of the associated adapter plate.

8. A plural valve mechanism comprising a plurality of separate valve mechanism units, each of said units comprising a valve body having formed therein a longitudinally extending valve cavity, three parallel openings extending completely therethrough transversely with respect to said cavity and each communicating with the latter, said three openings constituting high pressure, low pressure and working ports, and a first valve seat formed in said cavity between said high pressure and working ports; a first valve member longitudinally movable in said cavity, said first valve member having means thereon for engaging the valve seat in said cavity and a longitudinally extending passageway therein, a second valve seat formed in said first valve member in surrounding relation to said passageway; a second valve member mounted for longitudinal movement with respect to said first valve member and having means for engaging the valve seat on the latter; and means extending transversely with respect to said openings and outwardly of said valve body for effecting a relative longitudinal movement in either direction between said valve member, said longitudinal movement effecting means being operable in one direction to communicate said working port with said high pressure port, said longitudinal movement effecting means being operable in the opposite direction to communicate said working port with said low pressure port through said passageway; and means for connecting said units together providing an exterior opening for communication with a source of high pressure fluid and passage means for communicating said opening with all of the high pressure ports of said units, an exterior opening for communication with a source of low pressure fluid and passage means for communicating said low pressure fluid opening with all of the low pressure ports of said units, and passage means communicating with each working port providing an associated exterior opening for communication with a working device.

9. A plural valve mechanism comprising a plurality of separate valve mechanism units, each of said units comprising a valve body having formed therein a longitudinally extending bore, a counterbore in one end of said bore defining with the bore an annular shoulder providing a first valve seat, and three parallel openings extending completely therethrough transversely with respect to said bore, one of said openings communicating with said bore adjacent said valve seat and constituting a working port, another of said openings communicating with said counterbore adjacent said valve seat and constituting a high pressure port, the other of said openings communicating with said counterbore in spaced relation to said high pressure port and constituting a low pressure port; a first valve member slidably mounted in said counterbore between said valve seat and said low pressure port, the end of said first valve member adjacent said valve seat having an annular surface for engaging the latter, said first valve member having a passageway extending longitudinally therethrough providing a second valve seat; a second valve member slidably mounted in said counterbore and extending outwardly therefrom, said second valve member having an element on the inner end portion thereof for engaging said second valve seat; and spring means carried by said valve body within said counterbore resiliently urging said first valve member in a direction to engage the annular surface thereof with said first valve seat, said second valve member being movable inwardly with said element in engagement with said second valve seat to move said first valve member away from said first valve seat and thereby communicate said high pressure port with said working port and being movable outwardly with the annular surface of said first valve member in engagement with said first valve seat to move said element away from said second valve seat to communicate said working port with said low pressure port; and means for connecting said units together providing an exterior opening for communication with a source of high pressure fluid and passage means for communicating said opening with all of the high pressure ports of said units, an exterior opening for communication with a source of low pressure fluid and passage means for communicating said low pressure fluid opening with all of the low pressure ports of said units, and passage means communicating with each working port providing an associated exterior opening for communication with a working device.

10. A plural valve mechanism comprising a plurality of separate valve mechanism units, each of said units comprising a valve body having formed therein a pair of parallel valve cavities extending longitudinally therein, a high presssure port extending completely through said valve body between said cavities transversely with respect thereto and in communication therewith, a parallel low pressure port extending completely through said valve body between said cavities transversely with respect thereto and in communication therewith, and a parallel working port for each cavity extending completely through said valve body transversely with respect to said cavities and in communication with one of said cavities; and valve means mounted within said cavities for movement into different positions to control the flow of fluid from said high pressure port to said working ports and from said working ports to said low pressure port; and means for connecting said units together providing an exterior opening for communication with a source of high pressure fluid and passage means for communicating said opening with all of the high pressure ports of said units, an exterior opening for communication with a source of low pressure fluid and passage means for communicating said low pressure fluid opening with all of the low pressure ports of said units, and passage means communicating with each working port providing an associated exterior opening for communication with a working device.

11. A plural valve mechanism as defined in claim 10 wherein said plurality of valve mechanism units comprises a single pair of units disposed in spaced parallel relation with their corresponding ports in substantial alignment, and wherein said connecting means comprises an intermediate adapter plate fixedly mounted between said units and outer adapter plates mounted on opposite sides of said units, said intermediate adapter plate closing communication between the working ports of said units and providing said high and low pressure passage means communicating the high and low pressure ports respectively of said units, each of said outer adapter plates providing said exterior opening for the working ports of the associated unit, one of said outer adapter plates providing said high pressure opening with the other closing the adjacent end of the high pressure port of the associated unit, one of said outer adapter plates providing said low pressure opening with the other closing the adjacent end of the low pressure port of the associated unit.

12. A plural valve mechanism as defined in claim 10 wherein said plurality of valve mechanism units is disposed in two parallel banks with each unit of one bank in spaced parallel relation with a unit of the other bank and their corresponding ports in substantial alignment, and wherein said connecting means comprises an intermediate adapter member fixedly mounted between said banks of units, said intermediate adapter member providing said high and low pressure exterior opening and passage means for all of said units, and an outer adapter plate fixedly mounted on the outer side of each of said units providing said working port communicating exterior openings for the associated unit.

13. A plural valve mechanism as defined in claim 10 wherein said plurality of valve mechanism units is disposed in spaced parallel relation with their corresponding ports in substantial alignment, and wherein said connecting means comprises an intermediate adapter plate fixedly mounted between each adjacent pair of units closing communication between adjacent working ports, each of said intermediate adapter plates providing said working port communicating passage means and said associated exterior openings for one of the associated units, said associated openings extending laterally outwardly of each intermediate adapter plate in opposite directions, each of said intermediate adapter plates also providing said high pressure and low presssure passage means for both of the associated units, said connecting means also including a pair of outer adapter plates fixedly mounted on the outer side of the outer parallel units, said outer adapter plates providing said working port communicating passage means and said associated exterior opening for one of the associated units, said outer adapter plates also providing said high pressure and low pressure exterior openings.

14. A plural valve mechanism comprising a pair of separate valve mechanism units, each of said units comprising a valve body having formed therein a pair of parallel valve cavities extending longitudinally therein, a high pressure port extending completely through said valve body between said cavities transversely with respect thereto and in communication therewith, a parallel low pressure port extending completely through said valve body between said cavities transversely with respect thereto and in communication therewith, and a parallel working port for each cavity extending completely through said valve body transversely with respect to said cavities and in communication with one of said cavities; and valve means mounted within said cavities for movement into different positions to control the flow of fluid from said high pressure port to said working ports and from said working ports to said low pressure port; said pair of valve units being disposed in spaced parallel relation with corresponding ports in alignment, means fixedly connected between said pair of valve units closing communication between the working ports of said units and having openings formed therein communicating the high pressure and low pressure ports respectively of said valve units and means fixedly connected to the opposite sides of said pair of valve units providing a conduit engaging opening communicating with the working port of at least one of the associated units.

15. A plural valve mechanism as defined in claim 14 wherein the means connected between said pair of valve units comprises an intermediate adapter plate and the means on opposite sides of said pair of valve mechanism units comprises outer adapter plates, said adapter plates and said valve mechanism units having aligned openings formed therein and fastening elements disposed in said aligned openings securing said adapter plates and said valve units in superposed relation.

16. A plural valve mechanism as defined in claim 15 wherein each of said units has planar surface means on opposite sides thereof adjacent the associate ends of said ports and an annular groove formed in said planar surface means in surrounding relation to the adjacent end of each of said ports, and wherein an annular sealing element is disposed within each of said grooves in engagement with the adjacent surface of the associated adapter plate.

17. A plural valve mechanism comprising a plurality of separate valve mechanism units, each of said units comprising a valve body having formed therein cavity means, a pair of annular valve seats in said cavity means, high pressure port defining means extending completely through said body in a direction transverse to said cavity means and communicating with the latter on one side of each of said valve seats, a working port associated with each of said valve seats extending completely through said body in a direction parallel with said high pressure port defining means and communicating with the other side of the associated valve seat within said cavity means, low pressure port defining means extending completely through said valve body in a direction parallal with said high pressure port defining means and communicating with said cavity means on the same side of each of said valve seats as said high pressure port defining means; a first pair of valve members longitudinally movable in said cavity means, each of said first valve members having means thereon for engaging a valve seat in said cavity means and a longitudinally extending passageway therein, each of said passageways having a valve seat formed therein; a second valve member for each of said first valve members having means for engaging the valve seat formed in the passageway thereof; and means for effecting a relative longitudinal movement in either direction between said valve body and said second valve members, said longitudinal movement effecting means being operable in one direction to communicate the working port associated with one of said valve seats in said cavity means with said high pressure port defining means and the other of said working ports with said low pressure port defining means through the associated passageway, said longitudinal movement effecting means being operable in the opposite direction to communicate said other working port with said high pressure port defining means and said one working port with said low pressure port defining means and said one working port with said low pressure port defining means through the associated passageway; means for connecting said units together providing an exterior opening for communication with a source of high pressure fluid and passage means for communicating said opening with the high pressure ports defining means of all of said units, an exterior opening for communication with a source of low pressure fluid and passage means for communicating said low pressure fluid opening with the low pressure port defining means of all of said units, and passage means communicating with each working port providing an associated exterior opening for communication with a working device.

18. A plural valve mechanism comprising a plurality of separate valve mechanism units, each of said units comprising a valve body having a pair of parallel bores extending longitudinally therethrough, each of said bores having a counterbore formed in one end thereof defining with the associated bore an annular shoulder providing a first valve seat; a first valve member slidably mounted in each of said counterbores, each of said first valve members having an end surface for engaging the associated first valve seat, a longitudinal passageway extending therethrough, and a second valve seat in said passageway adjacent said first valve seat engaging surface; plug means in the outer end of each counterbore; spring means within each counterbore between the associated plug means and first valve member for resiliently urging the latter toward the associated first valve seat; and a second valve member slidably mounted in each of said valve body bores and having an annular surface for engaging the associated second valve seat, said valve body having formed therein a high pressure port extending transversely completely therethrough between said counterbores and communicating with the latter adjacent the first valve seats therein, a parallel low pressure port extending transversely completely therethrough between said counterbores and communicating with the latter between the first valve members and plug means therein, and a parallel working port for each bore extending transversely completely therethrough and in communication with one of said bores adjacent the associated first valve seat thereof; means for connecting said units together providing an exterior opening for communication with a source of high pressure fluid and passage means for communicating said opening with all of the high pressure ports of said units, an exterior opening for communication with a source of low pressure fluid and passage means for communicating said low pressure fluid opening with all of the low pressure ports of said units, and passage means communicating with each working port providing an associated exterior opening for communication with a working device.

19. A plural valve mechanism comprising a plurality of separate valve mechanism units, each of said units comprising a valve body having a pair of parallel bores extending longitudinally therethrough, each of said bores having a counterbore formed in one end thereof defining with the associated bore an annular shoulder providing a first valve seat; a first cylindrical valve member slidably mounted in each of said counterbores, each of said first valve members having an outwardly facing outer frusto-conical surface for engaging the associated first valve seat, an inner end portion adjacent said surface relieved at the exterior periphery thereof, a longitudinal passageway extending therethrough, and a second valve seat in said passageway adjacent said first valve seat engaging surface; plug means in the outer end of each counterbore; spring means within each counterbore between the associated plug means and first valve member for resiliently urging the latter toward the associated first valve seat; and a second cylindrical valve member slidably mounted in each of said valve body bores and having one end portion extending from the associated bore outwardly of said valve body, a stem extending from the inner end thereof and a segmental spherical element on said stem providing an annular surface for engaging the associated second valve seat, a rocker arm member pivotally mounted on said valve body between the outwardly extending end portions of said second valve members, said rocker arm member including opposed arm portions connected with said second valve member end portions and an intermediate socket portion for receiving an actuating means for said rocker arm member, said valve body having formed therein a high pressure port extending transversely completely therethrough between said counterbores and communicating with the latter adjacent the first valve seats therein, a parallel low pressure port extending transversely completely therethrough between said counterbores and communicating with the latter between the first valve members and plug means therein, and a parallel working port for each bore extending transversely completely therethrough and in communication with one of said bores adjacent the associated first valve seat thereof; means for connecting said units together providing an exterior opening for communication with a source of high pressure fluid and passage means for communicating said opening with all of the high pressure ports of said units, an exterior opening for communication with a source of low pressure fluid and passage means for communicating said low pressure fluid opening with all of the low pressure ports of said units, and passage means communicating with each working port providing an associated exterior opening for communication with a working device.

References Cited in the file of this patent

UNITED STATES PATENTS

| | | | |
|---|---|---|---|
| 926,142 | Schodde | June 29, | 1909 |
| 1,797,591 | Sartakoff | Mar. 24, | 1931 |
| 2,322,740 | Vanderzee | June 22, | 1943 |
| 2,586,932 | Gardiner | Feb. 26, | 1952 |
| 2,834,368 | Gray | May 13, | 1958 |
| 2,856,960 | Stacey | Oct. 21, | 1958 |
| 2,924,240 | Dolan | Feb. 9, | 1960 |
| 2,954,051 | Krehbiel | Sept. 27, | 1960 |
| 2,970,571 | Pecchenino | Feb. 7, | 1961 |
| 2,999,513 | Oetiker | Sept. 12, | 1961 |
| 3,025,878 | Hupp | Mar. 20, | 1962 |

FOREIGN PATENTS

| | | | |
|---|---|---|---|
| 16,061 | Great Britain | | 1902 |
| 338,341 | Great Britain | Nov. 20, | 1930 |
| 799,228 | Great Britain | Aug. 6, | 1958 |
| 807,196 | France | Oct. 12, | 1936 |
| 909,099 | France | Nov. 26, | 1945 |